United States Patent
Li et al.

(10) Patent No.: US 9,448,914 B2
(45) Date of Patent: Sep. 20, 2016

(54) METHOD AND SYSTEM FOR IMPLEMENTING REMOTE DEBUGGING

(71) Applicant: TENCENT TECHNOLOGY (SHENZHEN) COMPANY LIMITED, Shenzhen (CN)

(72) Inventors: Feng Li, Shenzhen (CN); Xudong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/724,808

(22) Filed: May 29, 2015

(65) Prior Publication Data

US 2015/0261650 A1    Sep. 17, 2015

Related U.S. Application Data

(63) Continuation of application No. PCT/CN2013/087929, filed on Nov. 27, 2013.

(30) Foreign Application Priority Data

Nov. 29, 2012  (CN) .......................... 2012 1 0499229

(51) Int. Cl.
  *G06F 9/44* (2006.01)
  *G06F 11/36* (2006.01)
  *H04L 29/08* (2006.01)

(52) U.S. Cl.
  CPC ............. *G06F 11/362* (2013.01); *H04L 67/28* (2013.01)

(58) Field of Classification Search
  USPC ....................................................... 717/124
  See application file for complete search history.

(56) References Cited

U.S. PATENT DOCUMENTS

| | | | | |
|---|---|---|---|---|
| 7,155,426 B2 * | 12/2006 | Al-Azzawe | ......... | G06F 11/3624 |
| 7,673,180 B1 * | 3/2010 | Chen | ..................... | G06F 11/362 |
| | | | | 714/38.11 |
| 8,589,885 B2 * | 11/2013 | Maybee | ................ | G06F 11/362 |
| | | | | 717/124 |
| 2005/0216895 A1* | 9/2005 | Tran | ...................... | G06F 11/362 |
| | | | | 717/127 |
| 2007/0055958 A1* | 3/2007 | Birenheide | .......... | G06F 11/362 |
| | | | | 717/124 |
| 2011/0258614 A1* | 10/2011 | Tamm | ................. | G06F 11/3644 |
| | | | | 717/129 |
| 2012/0084753 A1* | 4/2012 | Maybee | ................ | G06F 11/362 |
| | | | | 717/124 |
| 2012/0084757 A1* | 4/2012 | Tamiya | ............... | G06F 11/3656 |
| | | | | 717/124 |
| 2015/0033205 A1* | 1/2015 | Wintergerst | .......... | G06F 11/362 |
| | | | | 717/124 |
| 2015/0261650 A1* | 9/2015 | Li | ........................ | G06F 11/362 |
| | | | | 717/124 |

FOREIGN PATENT DOCUMENTS

| | | |
|---|---|---|
| CN | 1825851 A | 8/2006 |
| CN | 1901569 A | 1/2007 |
| CN | 102279790 A | 12/2011 |

OTHER PUBLICATIONS

The World Intellectual Property Organization (WIPO) International Search Report for PCT/CN2013/087929 Mar. 6, 2014.

* cited by examiner

*Primary Examiner* — Marina Lee
(74) *Attorney, Agent, or Firm* — Anova Law Group, PLLC

(57) ABSTRACT

The present disclosure discloses a method and a system for implementing remote debugging, and relates to the field of communications technologies. The disclosed methods and systems can implement remote debugging across different local area networks (LANs). A transit agent, a debugger agent, and a debuggee agent are configured in a remote debugging system. The transit agent may, according to a stored mapping table, forward information sent by the debugger agent and the debuggee agent, to transmit information between a remote debugging client and a remote debugging server that are in different LANs.

10 Claims, 4 Drawing Sheets

METHOD AND SYSTEM FOR
IMPLEMENTING REMOTE DEBUGGING

RELATED APPLICATION

This application is a continuation application of PCT Application No. PCT/CN2013/087929, filed on Nov. 27, 2013, which claims priority to Chinese Patent Application No. 201210499229.5, entitled "METHOD AND SYSTEM FOR IMPLEMENTING REMOTE DEBUGGING", and filed on Nov. 29, 2012, the entire contents of all of which are incorporated herein by reference

FIELD OF THE TECHNOLOGY

The present disclosure generally relates to the field of communications technologies and, more particularly, relates to a method and a system for implementing remote debugging.

BACKGROUND OF THE DISCLOSURE

Remote debugging refers to a debugging policy of using a debugging tool on a computer to debug a program on another computer.

In an existing remote debugging technology, two parties are mainly included: a debugger and a debuggee. A party that debugs by using a debugging tool is referred to as a "debugger", for example, a client Visual Studio 2010 that runs a debugging tool; and a party that is debugged by using a debugging tool is referred to as a "debuggee", for example, a server-side MSVSMON in which a debugging tool is run. By means of the remote debugging, a debugger may enter, from a debugging environment of the debugger itself at the first time, an environment in which a debuggee has a problem, track, and position the root of the problem, thereby improving efficiency of discovering a problem and solving the problem by the debugger, so that the remote debugging becomes very popular among software debuggers.

In the existing remote debugging technology, a remote debugging and analysis function based on a local area network (LAN) is implemented by using a third-party debugging tool, and at present, common third-party debugging tools include: Visual Studio and WinDbg on a Windows platform, and GNU Debugger (gdb) on a Linux platform. Both the two tools: Visual Studio and the WinDbg are from Microsoft Corporation, while the gdb is a standard debugging device in a GNU system.

Although all the third-party tools described above provide a remote debugging function, that is, a client of a debugging tool and a server-side program are provided, a connection between a debugger and a debuggee cannot be directly established when the debugger and the debuggee are located in different LANs, because the LANs usually use their own gateways. That is, the remote debugging function of these debugging tools cannot be directly used.

SUMMARY

Embodiments of the present invention provide a method and a system for implementing remote debugging, which can implement cross-LAN remote debugging. To achieve the foregoing objective, the following technical solutions are used in the embodiments of the present invention.

One aspect of present disclosure provides a method for implementing remote debugging by a remote debugging system, the remote debugging system including a remote debugging client, a debugger agent, a transit agent, a debuggee agent, and a remote debugging server, the remote debugging client and the debugger agent both belonging to a first LAN, the debuggee agent and the remote debugging server both belonging to a second LAN, the second LAN and the first LAN being different communication networks, and the transit agent belonging to an external communication network excluding the first LAN and the second LAN. The method includes sending, by the remote debugging client, debugging information to the debugger agent; acquiring, by the debugger agent, a process identifier corresponding to the remote debugging client, a receive port identifier, and keyword information corresponding to the debugger agent; and encapsulating the process identifier corresponding to the remote debugging client, the receive port identifier, the keyword information corresponding to the debugger agent, and the debugging information in a packet, and sending the packet to the transit agent; performing, by the transit agent, decapsulation processing on the packet to obtain the keyword information corresponding to the debugger agent, determining, according to a stored mapping table, the debuggee agent that has a correspondence to the debugger agent, and forwarding the packet to the debuggee agent that has a correspondence to the debugger agent; performing, by the debuggee agent, decapsulation processing on the packet to obtain the debugging information, the process identifier corresponding to the remote debugging client, and the receive port identifier, and sending, according to the receive port identifier, the debugging information to a corresponding port of the remote debugging server corresponding to the process identifier; and performing, by the remote debugging server, debugging according to the debugging information.

Another aspect of present disclosure provides a system for implementing remote debugging. The system includes a remote debugging client, a debugger agent, a transit agent, a debuggee agent, and a remote debugging server. The remote debugging client and the debugger agent both belong to a first LAN. The debuggee agent and the remote debugging server both belong to a second LAN, and the second LAN and the first LAN are different communication networks. The transit agent belongs to an external communication network excluding the first LAN and the second LAN. The remote debugging client is configured to send debugging information to the debugger agent. The debugger agent is configured to acquire a process identifier corresponding to the remote debugging client, a receive port identifier, and keyword information corresponding to the debugger agent; and to encapsulate the process identifier corresponding to the remote debugging client, the receive port identifier, the keyword information corresponding to the debugger agent, and the debugging information in a packet, and to send the packet to the transit agent. The transit agent is configured to perform decapsulation processing on the packet to obtain the keyword information corresponding to the debugger agent, to determine, according to a stored mapping table, the debuggee agent that has a correspondence to the debugger agent, and to forward the packet to the debuggee agent that has the correspondence to the debugger agent. The debuggee agent is configured to perform decapsulation processing on the packet to obtain the debugging information, the process identifier corresponding to the remote debugging client, and the receive port identifier, and to send, according to the receive port identifier, the debugging information to a corresponding port of the remote debugging server corresponding to the process identifier.

The remote debugging server is configured to perform debugging according to the debugging information.

According to the method and the system for implementing remote debugging provided by the embodiments of the present invention, a transit agent, a debugger agent, and a debuggee agent are configured in a remote debugging system, where the transit agent may forward, according to a stored mapping table, information sent by the debugger agent and the debuggee agent to transmit information between a remote debugging client and a remote debugging server that are in different LANs. Compared with the existing technology in which remote debugging can be implemented only in a same LAN, the embodiments of the present invention can implement remote debugging across different LANs to provide applicability of the remote debugging.

BRIEF DESCRIPTION OF THE DRAWINGS

To describe the technical solutions in the embodiments of the present invention or in the existing technology more clearly, the following briefly introduces the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

Embodiment 1

This exemplary embodiment of the present invention provides a method for implementing remote debugging using a remote debugging system. The remote debugging system includes a remote debugging client, a debugger agent, a transit agent, a debuggee agent, and a remote debugging server. The remote debugging client and the debugger agent both belong to a first LAN, the debuggee agent and the remote debugging server both belong to a second LAN, the second LAN and the first LAN are different communication networks, and the transit agent belongs to an external communication network excluding the first LAN and the second LAN. The LANs are separated by using a corresponding gateway.

In the exemplary system, the transit agent is used as a core forwarding module, and generally, only one transit agent is configured in one remote debugging system and is configured on an independent server; while one or more debugger agents and debuggee agents may be separately configured, and all the debugger agents and debuggee agents are connected to the same transit agent. For ease of management, it is usually set that one debugger agent is responsible for sending and receiving debugging information of one or more remote debugging clients in one LAN, and one debuggee agent is responsible for sending and receiving debugging information of one or more remote debugging servers in one LAN.

In the remote debugging system provided by this exemplary embodiment of the present invention, the remote debugging clients and the remote debugging servers are all set based on any one or multiple of remote debugging tools, including, for example, Visual Studio or WinDbg on a Windows platform, and gdb on a Linux platform. The debugger agent may be integrated in a same device with the one or more remote debugging clients, and the debuggee agent may be integrated in a same device with the one or more remote debugging servers.

Figure 1:
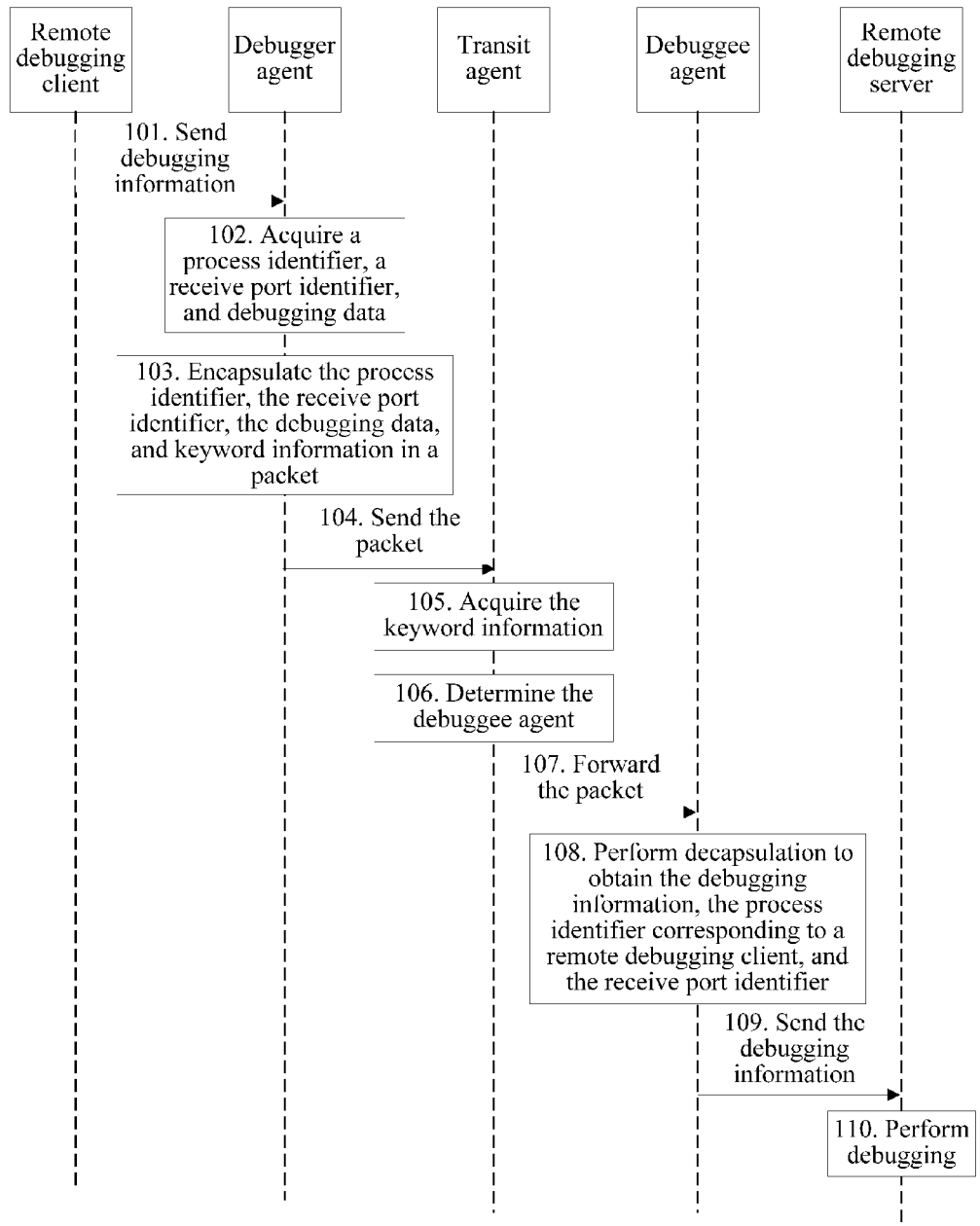
FIG. 1 is a flowchart of a method for implementing remote debugging according to first exemplary embodiment of the present invention.

Based on the foregoing remote debugging system, this exemplary embodiment of the present invention provides the method for implementing remote debugging. As shown in FIG. 1, the method includes as follows.

101: The remote debugging client sends debugging information to the debugger agent.

The debugging information may include, but is not limited to, connection establishment request information, disconnection request information, and debugging data.

102: The debugger agent acquires a process identifier corresponding to the remote debugging client, a receive port identifier, and keyword information corresponding to the debugger agent.

The process identifier is in a one-to-one correspondence to the remote debugging client. Because the debugger agent needs to be responsible for forwarding and receiving information of multiple remote debugging clients, process identifiers need to be used for differentiation.

The receive port identifier is used to represent a port at which the remote debugging server receives the debugging information.

The keyword information is used to identify a correspondence, which is stored in the transit agent, between the debugger agent and the debuggee agent.

103: The debugger agent encapsulates the process identifier corresponding to the remote debugging client, the receive port identifier, the keyword information corresponding to the debugger agent, and the debugging information in a packet.

A manner of encapsulating the packet is customized in the present disclosure, and therefore, in this exemplary embodiment, multiple independent fields are needed in the packet for separately identifying a type of the packet, the process identifier, the receive port identifier, and debugging data. The type of the packet is used to represent whether the packet is control information or data information, for example, when the debugging information sent by the remote debugging client to the debugger agent is connection establishment request information, the type of the packet should be identified as control information; and when the debugging information sent by the remote debugging client to the debugger agent is debugging data, the type of the packet should be identified as data information. A method for encapsulating the packet may be extended based on the TCP (transmission control protocol).

104: Send the packet to the transit agent.

105: The transit agent performs decapsulation processing on the packet, to obtain the keyword information corresponding to the debugger agent. A method for performing the decapsulation processing corresponds to a method, which is described in step 103, for performing the encapsulation processing.

106: The transit agent determines, according to a stored mapping table, the debuggee agent that has a correspondence to the debugger agent.

107: The transit agent forwards the packet to the debuggee agent that has the correspondence to the debugger agent.

108: The debuggee agent performs decapsulation processing on the packet, to obtain the debugging information, the process identifier corresponding to the remote debugging client, and the receive port identifier.

A method for performing the decapsulation processing is the same as that in the description in step 105, and also corresponds to the method, which is described in step 103, for performing the encapsulation processing.

109: The debuggee agent sends, according to the receive port identifier, the debugging information to a corresponding port of the remote debugging server corresponding to the process identifier.

110: The remote debugging server performs debugging according to the debugging information.

A procedure of a method for sending the debugging information by the remote debugging client to the remote debugging server are described in step 101 to step 110, and the debugging information flows from the remote debugging client to: the debugger agent, the transit agent, the debuggee agent, and the remote debugging server. It should be noted that, in a procedure of a method for sending debugging information by the remote debugging server to the remote debugging client, the debugging information flows from the remote debugging server to the debuggee agent, the transit agent, the debugger agent, and the remote debugging client, and specific implementation of forwarding by functional modules is similar to that of the method described in step 101 to step 110.

According to the method for implementing remote debugging provided by this exemplary embodiment of the present invention, a transit agent, a debugger agent, and a debuggee agent are configured in a remote debugging system, where the transit agent completes, according to a stored mapping table, the forwarding of information sent by the debugger agent and the debuggee agent, thereby implementing information transmission between a remote debugging client and a remote debugging server that are located in different LANs. Compared with the existing technology in which remote debugging can be implemented only in a same LAN, this exemplary embodiment of the present invention can implement cross-LAN remote debugging, and provide applicability of the remote debugging.

Figure 2:
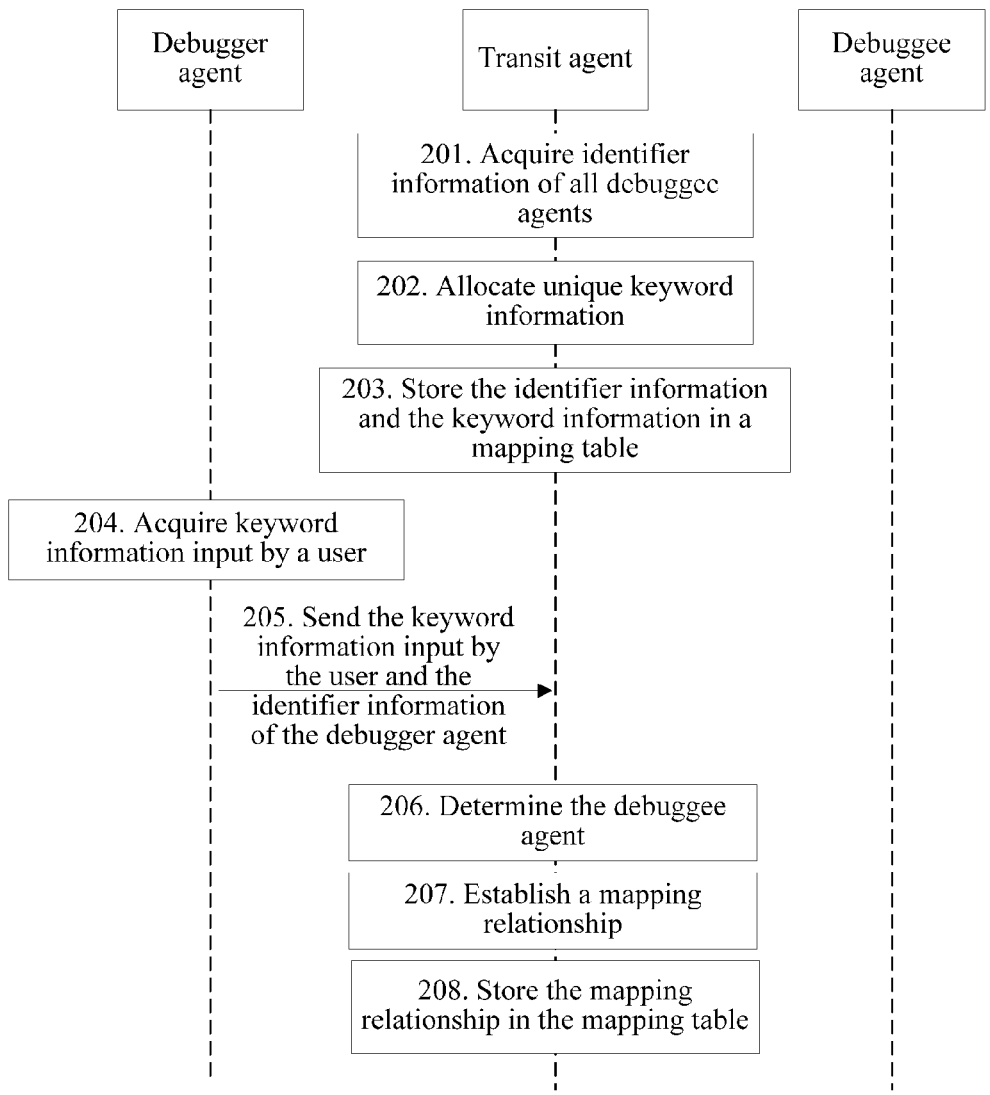
FIG. 2 is a flowchart of a method for establishing a mapping relationship between a debugger agent and a debuggee agent according to the first exemplary embodiment of the present invention.

Further, this exemplary embodiment of the present invention provides a method for establishing a mapping relationship between the debugger agent and the debuggee agent, for setting a mapping table of a transit device. The method is performed before step 101. As shown in FIG. 2, the method specifically includes the following.

201: The transit agent acquires identifier information of all debuggee agents.

The identifier information of the debuggee agent may be implemented by using information having an identification function, such as socket. For example, socket of the debuggee agent is 555, and socket of the debugger agent is 444.

202: The transit agent allocates unique keyword information to each debuggee agent.

The keyword information may be set to natural numbers such as 1 and 2, and for a specific implementation method thereof, reference may be made to Table 1 below.

TABLE 1

| Mapping Table | | | | | | |
|---|---|---|---|---|---|---|
| Keyword information | User IP | User name | State of a debuggee | Socket of a debuggee agent | State of a debugger | Socket of a debugger agent |
| 1 | 11.11.11.11 | Zhangsan | READY | 555 | 0 | 0 |
| 2 | 22.22.22.22 | Lisi | BUSY | 666 | BUSY | 777 |
| 3 | 33.33.33.33 | Wangwu | ERROR | 888 | ERROR | 999 |

In Table 1, the keyword information is a row identifier of each row, and the identifier information of the debuggee agent and the identifier information of the debugger agent are identified by using socket. The state of the debuggee and the state of the debugger may be indicated by using 0 (meaning "no such a device"), READY (meaning "remote debugging may be performed"), BUSY (meaning "remote debugging is being performed"), or ERROR (meaning "device error").

It should be noted that Table 1 is only an example in this exemplary embodiment of the present invention, and in the mapping table, the keyword information, the socket of the debuggee agent, and the socket of the debugger agent must be stored. It may be understood that settings of other entries are not necessary for monitoring and maintenance by a maintainer.

203: The transit agent stores the identifier information of the debuggee agent and the keyword information in the mapping table in a mutually corresponding manner.

A correspondence between identifier information of a debuggee agent and keyword information may be indicated by using a storage method in the first row in Table 1, that is, a mutual correspondence between identifier information of a debuggee agent and allocated keyword information is indicated by storing the identifier information of the debuggee agent and the allocated keyword information in a same row in Table 1.

204: The debugger agent acquires keyword information selected by a user.

A specific implementation method for acquiring keyword information selected by a user is as follows and includes: receiving, by the debugger agent, state information of the debuggee agent that is sent by the transit agent, the state information of the debuggee agent including the identifier information of the debuggee agent and the keyword information, that correspond to each other; displaying, by the debugger agent, the state information of the debuggee agent; and receiving, by the debugger agent, the keyword information of the debuggee agent that is input by the user, and determining that the keyword information of the debuggee agent that is input by the user is the keyword information selected by the user.

205: The debugger agent sends the keyword information selected by the user and the identifier information of the debugger agent to the transit agent.

206: The transit agent determines, according to the keyword information, a debuggee agent corresponding to the keyword information selected by the user.

207: The transit agent establishes a mapping relationship among the three of the keyword information selected by the user, identifier information of the debuggee agent corresponding to the keyword information selected by the user, and the identifier information of the debugger agent.

For storage of the mapping relationship among the three of the keyword information selected by the user, the identifier information of the debuggee agent corresponding to the keyword information selected by the user, and the identifier information of the debugger agent, reference may be made to content recorded in the second row and the third row in Table 1. That is, the keyword information selected by the user, the identifier information of the debuggee agent corresponding to the keyword information selected by the user, and the identifier information of the debugger agent among which the mapping relationship exits are recorded in the same row in Table 1.

Figure 3:
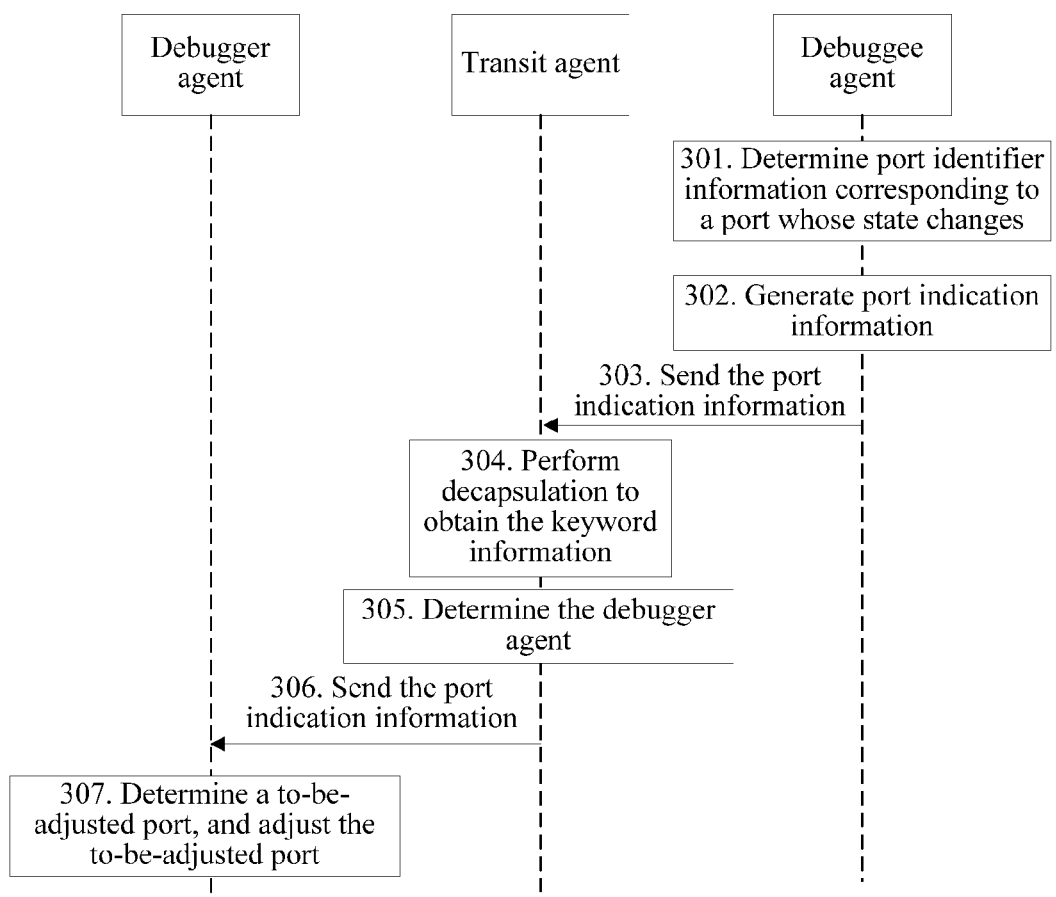
FIG. 3 is a flowchart of a method for synchronizing a port state according to the first exemplary embodiment of the present invention.

208: The transit agent stores the mapping relationship in the mapping table. Further, in this exemplary embodiment, the remote debugging server opens or closes a port to adapt to data transmission in various environments. In this case, the debugger agent must also adjust a port state of the debugger agent correspondingly, to ensure accuracy and security of data transmission with the remote debugging client. This exemplary embodiment of the present invention provides a method for synchronizing a port state. As shown in FIG. 3, the method includes the following.

301: The debuggee agent determines, when detecting that a state of at least one port of the remote debugging server changes, port identifier information corresponding to the at least one port. A state of a port includes two types: an opened state and a closed state.

302: The debuggee agent performs encapsulation according to a current state of the at least one port, the corresponding port identifier information, and the identifier information of the debuggee agent, to generate port indication information. The port indication information may only represent a current state of one port, or may represent current states of multiple ports at the same time.

303: The debuggee agent sends the port indication information to the transit agent.

304: The transit agent performs decapsulation processing on the port indication information to obtain the keyword information corresponding to the debuggee agent.

305: The transit agent determines, according to the stored mapping table, the debugger agent that has a correspondence to the debuggee agent.

306: The transit agent forwards the port indication information to the debugger agent that has a correspondence to the debuggee agent.

307: The debugger agent determines a to-be-adjusted port according to the port indication information, and adjusts a state of the to-be-adjusted port.

A method for determining a to-be-adjusted port according to the port indication information may include: directly adjusting, according to the port identifier information carried in the port indication information, a port that has the same port identifier information as the port indication information.

According to the method for implementing remote debugging provided by this exemplary embodiment of the present invention, a transit agent, a debugger agent, and a debuggee agent are configured in a remote debugging system, where the transit agent completes, according to a stored mapping table, forwarding of information sent by the debugger agent and the debuggee agent, thereby implementing information transmission between a remote debugging client and a remote debugging server that are in different LANs. Compared with the existing technology in which remote debugging can be implemented only in a same LAN, this exemplary embodiment of the present invention can implement cross-LAN remote debugging, and provide applicability of the remote debugging.

Embodiment 2

Figure 4:
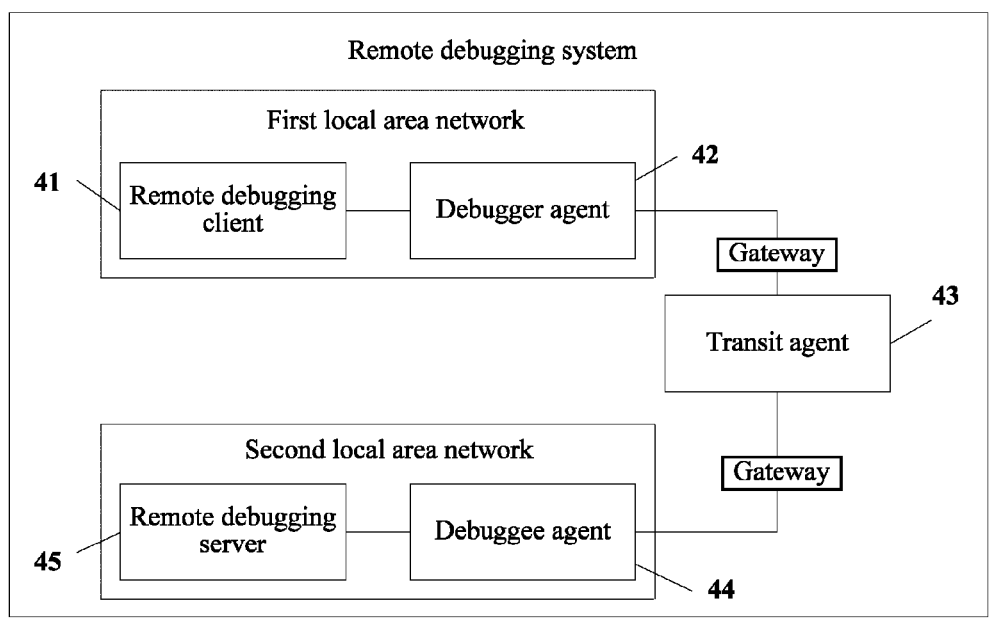
FIG. 4 is a block diagram of a system for implementing remote debugging according to second exemplary embodiment of the present invention.

This exemplary embodiment of the present invention provides a system for implementing remote debugging. As shown in FIG. 4, the remote debugging system includes a remote debugging client 41, a debugger agent 42, a transit agent 43, a debuggee agent 44, and a remote debugging server 45, where the remote debugging client 41 and the debugger agent 42 both belong to a first LAN, the debuggee agent 44 and the remote debugging server 45 both belong to a second LAN, the second LAN and the first LAN are different communication networks, and the transit agent 43 belongs to an external communication network excluding the first LAN and the second LAN. The LANs are separated by using corresponding gateways.

The remote debugging client 41 may include one or more computer programs residing on a computer readable storage medium of the debugging system. When the computer programs are executed by a processor, such as a processor of the remote debugging system, the remote debugging client 41 is configured to send debugging information to the debugger agent 42. In one embodiment, the remote debugging system may include a computing device (e.g., a computer) on which a remote debugging client and a debugger agent are run. The remote debugging system may further include a computing device (e.g., a computer), on which programs that need to be debugged reside, i.e., a debugee server or a debugee agent.

The debugger agent 42 may include one or more computer programs residing on a computer readable storage medium of the remote debugging system. When the computer programs are executed by a processor, such as a processor of the remote debugging system, the debugger agent 42 is configured to acquire a process identifier corresponding to the remote debugging client 41, a receive port identifier, and keyword information corresponding to the debugger agent 42; and to encapsulate the process identifier corresponding to the remote debugging client 41, the receive port identifier, the keyword information corresponding to the debugger agent 42, and the debugging information in a packet, and to send the packet to the transit agent 43.

The transit agent 43 may include one or more computer programs residing on a computer readable storage medium of the remote debugging system. When the computer programs are executed by a processor, such as a processor of the remote debugging system, the transit agent 43 is configured to perform decapsulation processing on the packet to obtain the keyword information corresponding to the debugger agent 42, to determine, according to a stored mapping table, the debuggee agent 44 that has a correspondence to the debugger agent 42, and to forward the packet to the debuggee agent 44 that has the correspondence to the debugger agent 42.

The debuggee agent 44 may include one or more computer programs residing on a computer readable storage medium of the remote debugging system. When the computer programs are executed by a processor, such as a processor of the remote debugging system, the debuggee agent 44 is configured to perform decapsulation processing on the packet to obtain the debugging information, the process identifier corresponding to the remote debugging client 41, and the receive port identifier, and to send, according to the receive port identifier, the debugging information to a corresponding port of the remote debugging server 45 corresponding to the process identifier.

The remote debugging server 45 may include one or more computer programs residing on a computer readable storage medium of the remote debugging system. When the computer programs are executed by a processor, such as a processor of the remote debugging system, the remote debugging server 45 is configured to perform debugging according to the debugging information.

Optionally, the debugging information includes connection establishment request information, disconnection request information, and debugging data.

Optionally, the transit agent 43 is further configured to acquire identifier information of all debuggee agents 44, to allocate unique keyword information to each debuggee agent 44, and to store a correspondence between the identifier information of the debuggee agent 44 and the keyword information in the mapping table.

The debugger agent 42 is further configured to acquire keyword information selected by a user, and to send the keyword information selected by the user and the identifier information of the debugger agent 42 to the transit agent 43.

The transit agent 43 is further configured to determine, according to the keyword information, a debuggee agent corresponding to the keyword information selected by the user, and establish a mapping relationship among the three of the keyword information selected by the user, identifier information of the debuggee agent corresponding to the keyword information selected by the user, and the identifier information of the debugger agent 42, and to store the mapping relationship in the mapping table.

Optionally, the debugger agent 42 is specifically configured to enable the debugger agent 42 to receive state information of the debuggee agent 44 that is sent by the transit agent 43, the state information of the debuggee agent 44 including the correspondence between the identifier information of the debuggee agent 44 and the keyword information; to display the state information of the debuggee agent 44; and to receive the keyword information of the debuggee agent 44 that is input by the user, and to determine that the keyword information of the debuggee agent 44 that is input by the user is the keyword information selected by the user.

Optionally, the debuggee agent 44 is configured to determine, when detecting that a state of at least one port of the remote debugging server 45 changes, port identifier information corresponding to the at least one port, to perform encapsulation according to a current state of the at least one port, the corresponding port identifier information, and the identifier information of the debuggee agent 44, to generate port indication information, and to send the port indication information to the transit agent 43.

The transit agent 43 is configured to perform decapsulation processing on the port indication information to obtain the keyword information corresponding to the debuggee agent 44, to determine, according to the stored mapping table, the debugger agent 42 that has a correspondence to the debuggee agent 44, and to forward the packet to the debugger agent 42 that has the correspondence to the debuggee agent 44.

The debugger agent 42 is further configured to determine a to-be-adjusted port according to the port indication information, and to adjust a state of the to-be-adjusted port.

According to the system for implementing remote debugging provided by this exemplary embodiment of the present invention, a transit agent, a debugger agent, and a debuggee agent are configured in a remote debugging system, where the transit agent completes, according to a stored mapping table, forwarding of information sent by the debugger agent and the debuggee agent, thereby implementing information transmission between a remote debugging client and a remote debugging server that are in different LANs. Compared with the existing technology in which remote debugging can be implemented only in a same LAN, this exemplary embodiment of the present invention can implement cross-LAN remote debugging, and provide applicability of the remote debugging.

According to the description of the foregoing embodiments, a person skilled in the art may clearly understand that, the present disclosure may be implemented by software in addition to necessary universal hardware and certainly, may also be implemented by hardware. In most circumstances, the former is a better implementation manner. Based on such an understanding, the technical solutions of the present disclosure essentially, or a part contributing to the existing technology may be implemented in a form of a software product. The computer software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of the present invention.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for implementing remote debugging by a remote debugging system, the remote debugging system comprising a remote debugging client, a debugger agent, a transit agent, a debuggee agent, and a remote debugging server, the remote debugging client and the debugger agent both belonging to a first local area network (LAN), the debuggee agent and the remote debugging server both belonging to a second LAN, the second LAN and the first LAN being different communication networks, and the transit agent belonging to an external communication network excluding the first LAN and the second LAN; and the method comprising:

sending, by the remote debugging client, debugging information to the debugger agent;

acquiring, by the debugger agent, a process identifier corresponding to the remote debugging client, a receive port identifier, and keyword information corresponding to the debugger agent; and encapsulating the process identifier corresponding to the remote debugging client, the receive port identifier, the keyword information corresponding to the debugger agent, and the debugging information in a packet, and sending the packet to the transit agent;

performing, by the transit agent, decapsulation processing on the packet to obtain the keyword information corresponding to the debugger agent, determining, according to a stored mapping table, the debuggee agent that has a correspondence to the debugger agent, and forwarding the packet to the debuggee agent that has the correspondence to the debugger agent;

performing, by the debuggee agent, decapsulation processing on the packet to obtain the debugging information, the process identifier corresponding to the remote debugging client, and the receive port identifier, and sending, according to the receive port identifier, the debugging information to a corresponding port of the remote debugging server corresponding to the process identifier; and performing, by the remote debugging server, debugging according to the debugging information.

2. The method according to claim 1, wherein the debugging information comprises connection establishment request information, disconnection request information, and debugging data.

3. The method according to claim 2, before the sending, by the remote debugging client, debugging information to the debugger agent, further comprising:

acquiring, by the transit agent, identifier information of all debuggee agents, allocating unique keyword information to each debuggee agent, and storing the identifier information of the debuggee agent and the keyword information in the mapping table in a mutually corresponding manner;

acquiring, by the debugger agent, keyword information selected by a user, and sending the keyword information selected by the user and the identifier information of the debugger agent to the transit agent; and determining, by the transit agent according to the keyword information, a debuggee agent corresponding to the keyword information selected by the user; and establishing a mapping relationship among the three of the keyword information selected by the user, identifier information of the debuggee agent corresponding to the keyword information selected by the user, and the identifier information of the debugger agent, and storing the mapping relationship in the mapping table.

4. The method according to claim 3, wherein the acquiring, by the debugger agent, of keyword information selected by the user comprises:

receiving, by the debugger agent, state information of the debuggee agent that is sent by the transit agent, wherein the state information of the debuggee agent comprises the identifier information of the debuggee agent and the keyword information, that correspond to each other;

displaying, by the debugger agent, the state information of the debuggee agent; and receiving, by the debugger agent, the keyword information of the debuggee agent that is input by the user, and determining that the keyword information of the debuggee agent that is input by the user is the keyword information selected by the user.

5. The method according to claim 3, further comprising:

determining, by the debuggee agent, when detecting that a state of at least one port of the remote debugging server changes, port identifier information corresponding to the at least one port, performing encapsulation according to a current state of the at least one port, the corresponding port identifier information, and the identifier information of the debuggee agent, to generate port indication information, and sending the port indication information to the transit agent;

performing, by the transit agent, decapsulation processing on the port indication information to obtain the keyword information corresponding to the debuggee agent, determining, according to the stored mapping table, the debugger agent that has the correspondence to the debuggee agent, and forwarding the port indication information to the debugger agent that has the correspondence to the debuggee agent; and determining, by the debugger agent, a to-be-adjusted port according to the port indication information, and adjusting a state of the to-be-adjusted port.

6. A system for implementing remote debugging, comprising:

a remote debugging client stored on a storage medium of a first computing device;

a debugger agent stored on a storage medium of a second computing device, the remote debugging client and the debugger agent both belonging to a first local area network (LAN);

a debuggee agent stored on a storage medium of a third computing device;

a remote debugging server stored on a storage medium of a fourth computation device, the debuggee agent and the remote debugging server both belonging to a second LAN, the second LAN and the first LAN being different communication networks; and a transit agent stored on a storage medium of a fifth computing device, the transit agent belonging to an external communication network excluding the first LAN and the second LAN, wherein:

the remote debugging client is configured to send debugging information to the debugger agent;

the debugger agent is configured to acquire a process identifier corresponding to the remote debugging client, a receive port identifier, and keyword information corresponding to the debugger agent; and to encapsulate the process identifier corresponding to the remote debugging client, the receive port identifier, the keyword information corresponding to the debugger agent, and the debugging information in a packet, and to send the packet to the transit agent;

the transit agent is configured to perform decapsulation processing on the packet to obtain the keyword information corresponding to the debugger agent, to determine, according to a stored mapping table, the debuggee agent that has a correspondence to the debugger agent, and to forward the packet to the debuggee agent that has the correspondence to the debugger agent;

the debuggee agent is configured to perform decapsulation processing on the packet to obtain the debugging information, the process identifier corresponding to the remote debugging client, and the receive port identifier, and to send, according to the receive port identifier, the debugging information to a corresponding port of the remote debugging server corresponding to the process identifier; and the remote debugging server is configured to perform debugging according to the debugging information.

7. The system according to claim 6, wherein the debugging information comprises connection establishment request information, disconnection request information, and debugging data.

8. The system according to claim 7, wherein the transit agent is further configured to acquire identifier information of all debuggee agents, to allocate unique keyword information to each debuggee agent, and to store the identifier information of the debuggee agents and the keyword information in the mapping table in a mutually corresponding manner;

the debugger agent is further configured to acquire keyword information selected by a user, and to send the keyword information selected by the user and the identifier information of the debugger agent to the transit agent; and the transit agent is further configured to determine, according to the keyword information, a debuggee agent corresponding to the keyword information selected by the user; and to establish a mapping relationship among the three of the keyword information selected by the user, identifier information of the debuggee agent corresponding to the keyword information selected by the user, and the identifier information of the debugger agent, and to store the mapping relationship in the mapping table.

9. The system according to claim 7, wherein the debugger agent is configured to enable the debugger agent to receive state information of the debuggee agent that is sent by the transit agent, the state information of the debuggee agent comprising the identifier information of the debuggee agent and the keyword information, that correspond to each other; to display the state information of the debuggee agent; and to receive the keyword information of the debuggee agent that is input by the user, and to determine that the keyword information of the debuggee agent that is input by the user is the keyword information selected by the user.

10. The system according to claim 7, wherein the debuggee agent is configured to determine, when detecting that a state of at least one port of the remote debugging server changes, port identifier information corresponding to the at least one port, to perform encapsulation according to a current state of the at least one port, the corresponding port identifier information, and the identifier information of the debuggee agent, to generate port indication information, and to send the port indication information to the transit agent;

the transit agent is configured to perform decapsulation processing on the port indication information to obtain the keyword information corresponding to the debuggee agent, to determine, according to the stored mapping table, the debugger agent that has the correspondence to the debuggee agent, and forward the packet to the debugger agent that has the correspondence to the debuggee agent; and the debugger agent is further configured to determine a to-be-adjusted port according to the port indication information, and to adjust a state of the to-be-adjusted port.

* * * * *